(12) United States Patent
Papsdorf

(10) Patent No.: US 6,749,251 B1
(45) Date of Patent: Jun. 15, 2004

(54) MOTOR VEHICLE

(76) Inventor: John Papsdorf, 222 Letts Rd., Oakland, MI (US) 48363

( * ) Notice: Subject to any disclaimer, the term of this patent is extended or adjusted under 35 U.S.C. 154(b) by 0 days.

(21) Appl. No.: 10/026,416

(22) Filed: Dec. 21, 2001

(51) Int. Cl.[7] .................................................. B60R 5/00
(52) U.S. Cl. ..................................... 296/164; 296/146.1
(58) Field of Search ............................... 296/146.1, 164

(56) References Cited

U.S. PATENT DOCUMENTS

| | | | |
|---|---|---|---|
| 4,127,299 A | * | 11/1978 | Blair |
| 4,691,958 A | * | 9/1987 | Miller |
| 5,011,215 A | * | 4/1991 | Kalina |
| 5,092,650 A | * | 3/1992 | Perlot |
| D390,525 S | | 2/1998 | Antos et al. |
| 5,746,466 A | | 5/1998 | Antos et al. |
| 6,209,614 B1 | | 4/2001 | Smoot |
| 6,293,612 B1 | | 9/2001 | Crean |

* cited by examiner

*Primary Examiner*—Stephen Gordon
(74) *Attorney, Agent, or Firm*—Bliss McGlynn, P.C.

(57) ABSTRACT

A motor vehicle includes a vehicle body having sides, a floor, and a roof defining an interior. The motor vehicle also includes a passageway located adjacent the floor and extending between the interior and an exterior of the motor vehicle for loading and unloading items on the floor. The motor vehicle further includes a door connected to the vehicle body between the interior and the exterior to open and close the passageway.

13 Claims, 2 Drawing Sheets

MOTOR VEHICLE

BACKGROUND OF THE INVENTION

1. Field of the Invention

The present invention relates generally to motor vehicles and, more particularly, to motor vehicles having a closeable passageway for loading and unloading items.

2. Description of the Related Art

Motor vehicles, in general, and motor homes, in particular, are often used in connection with extended travel. Such travel can include excursions on the road for many hours or even days, such as cross-country trips. On such excursions and in the case of a motor home, occupants thereof often live in the motor home, rather than expending time, money, and effort in securing lodging for rest or stopping for provisions. Accordingly, motor homes are habitably furnished.

Motor homes generally include a substantially rectangularly shaped vehicle body supported above a surface on wheels. The vehicle body has a front, a back, two sides, a floor, and a roof defining an interior and an exterior of the vehicle body. Each side often includes a plurality of windows disposed along the side adjacent the roof. Each window typically is adapted to open such that an opening can be provided between the interior and the exterior. Also, one of the sides usually has a door connected to the side adjacent the front, extending substantially between the roof and the floor, and having a window disposed on a portion of the door adjacent the roof. The door is adapted to open such that an opening can be provided between the interior and the exterior for the ingress and egress of occupants of the motor home. A staircase consisting of no more than a few steps normally extends from the floor adjacent the door to the surface to permit occupants access to/from the door from/to the surface. The front includes a windshield that extends substantially the entire length of the front. Similarly, the back sometimes has a windshield that extends substantially the entire length of the back.

As stated above, motor homes are habitably furnished. The interior thereof can include several rooms—such as a bedroom, a kitchen, and a dining room. These rooms, in turn, can include many accessories—such as appliances, electronic devices, cupboards, shelves, drawers, beds, couches, seats, faucets, sinks, and so forth—to accommodate the living needs and comfort of its occupants. Prior to, during, and/or after travel of an extended nature or even other activities, such as a picnic, using the motor home, occupants thereof must supply the interior with or remove from the interior various items—such as food, drinks, utensils, linen, toiletries, cleaning products, etc.

When loading/unloading such items into/from the motor home, it is necessary for the items to be transported through the door and/or windows. However, since the windows are usually positioned too high above the surface for occupants to reach from the surface, the door is generally used. Upon entering the interior of the motor home, the items then may need to be transported across the floor to reach the furnishings to which the items belong. For example, many canned goods may need to be stocked in a cupboard in the kitchen, which may be located near the back. This can result in not only leaving the door and/or windows open, which can permit unwanted entry of insects and the elements of the weather into the motor home, but also confusion and danger by having to continually walk up and down the steps and maneuver about the furnishings when the motor home is crowded with other occupants. This is not only inconvenient and time-consuming, but can also result in tracking into the motor home dirt and debris from the occupants of the motor home.

While the related art addresses passageways to vent walls in a motor home, the related art does not seem to address the problem directly of providing an access passageway that may be used repeatedly to cleanly, conveniently, easily, and quickly load and unload groceries, dry goods, hardware, and the like and remains closed when not in use. Therefore, it is desirable to provide a closeable passageway through a side of a motor home through which the above items may be easily passed from time to time for the purpose of loading the motor home with these items and/or the unloading same from the motor home.

SUMMARY OF THE INVENTION

Accordingly, the present invention is a motor vehicle including a vehicle body having sides, a floor, and a roof defining an interior. The motor vehicle further includes a passageway located adjacent the floor and extending between the interior and an exterior of the vehicle body for loading and unloading items. The motor vehicle further includes a door connected to the vehicle body between the interior and the exterior to close the passageway.

One advantage of the present invention is that a motor vehicle is provided having a passageway that permits easy access to/from an interior of the motor vehicle for cleanly, conveniently and quickly loading/unloading items into/from the motor vehicle. Another advantage of the present invention is that the motor vehicle has a passageway that can be used as an emergency exit for occupants of the motor vehicle. Yet another advantage of the present invention is that the motor vehicle has a passageway that is closeable when not in use.

Still another advantage of the present invention is that the motor vehicle has a passageway that may be installed through any side of a motor vehicle. A further advantage of the present invention is that the motor vehicle has a passageway that is substantially air and/or water tight when the passageway is closed.

Other features and advantages of the present invention will be readily appreciated as the same becomes better understood after reading the subsequent description when taken in conjunction with the accompanying drawings.

DESCRIPTION OF THE PREFERRED EMBODIMENT(S)

Figure 1:
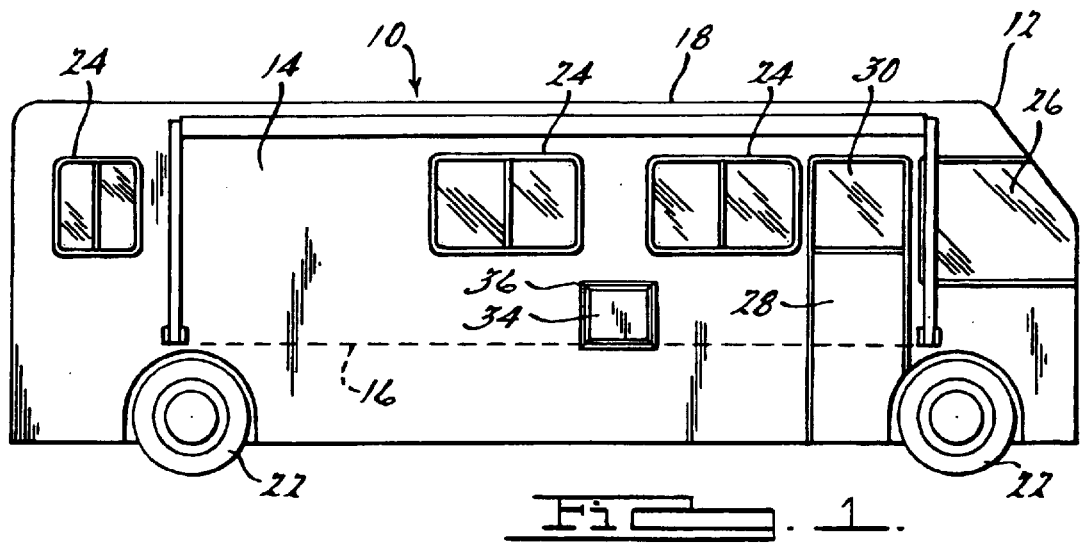
FIG. 1 is an elevational view of a motor vehicle, according to the present invention, illustrating a closeable passageway in a closed position.

Referring now to the drawings, a motor vehicle, according to the present invention, in the form of a motor home is generally shown at 10 in FIG. 1. Those having ordinary skill in the art will appreciate that the motor vehicle 10, however, can be of any form—mobile home, van, truck, etc. The motor vehicle 10 has a substantially rectangularly cross-sectional shape and includes a vehicle body 12 having sides 14, a floor 16, and a roof 18 defining an interior 20 and an exterior of the vehicle body 12. The motor vehicle 10 further includes a set of wheels 22, which supports the vehicle body 12 above a surface (not shown) upon/along which the motor vehicle 10 rests/travels.

As illustrated in FIG. 1, the side 14 includes three sets of windows 24 and a windshield 26 that are substantially horizontally aligned, spaced from each other, and disposed across the side 14 adjacent the roof 18. The windows 24 are adapted to slidingly, inwardly, or outwardly open and close such that an opening between the interior 20 and the exterior can be provided when the windows 24 are open. The side 14 further includes a door 28 located between the window 24 proximate the windshield 26 and extending substantially between the floor 16 and the roof 18 to permit entry into and exit from the motor home 10 by occupants thereof. The door 28 includes a window 30 disposed at a top portion of the door 28 adjacent the roof 18 and substantially aligned with the windows 24 and the windshield 26.

Figure 2:
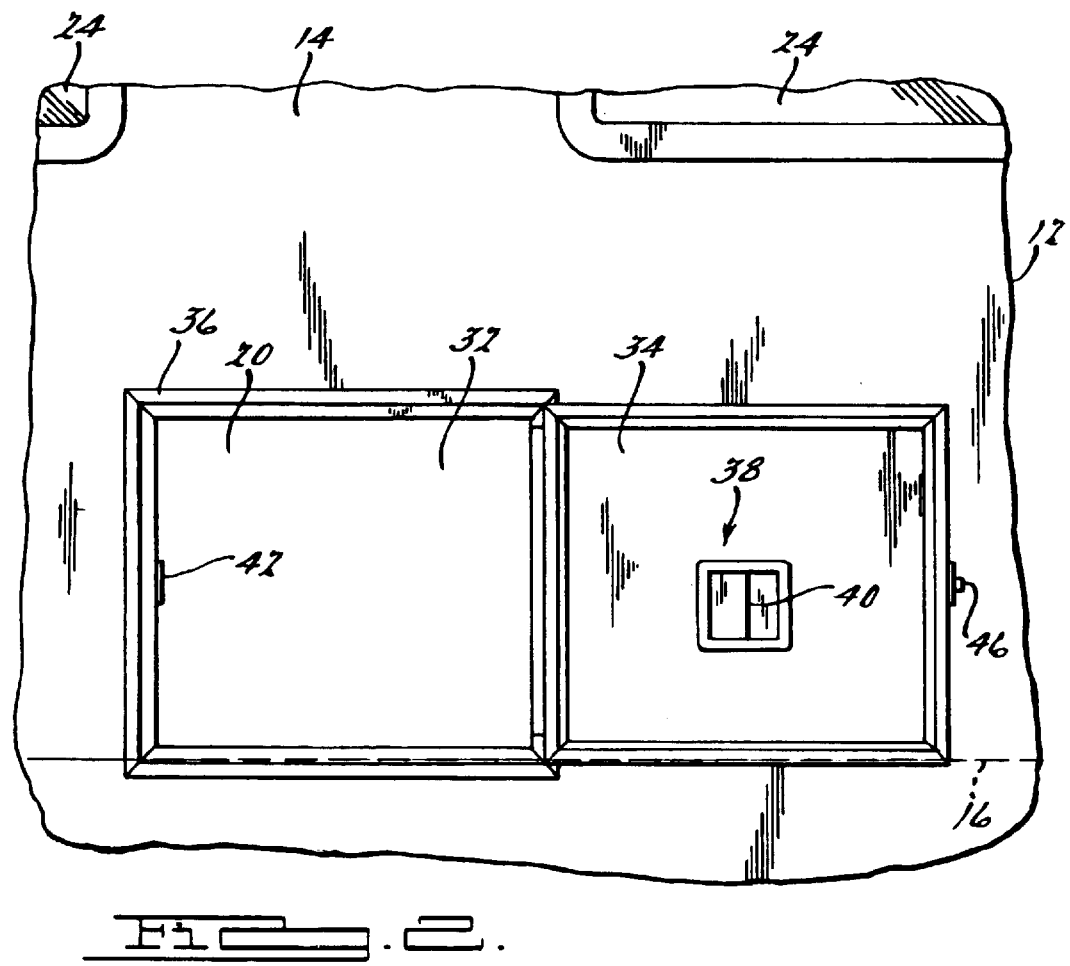
FIG. 2 is a partial enlarged view of the motor vehicle of FIG. 1 illustrating the closeable passageway in an opened position.
Figure 3:
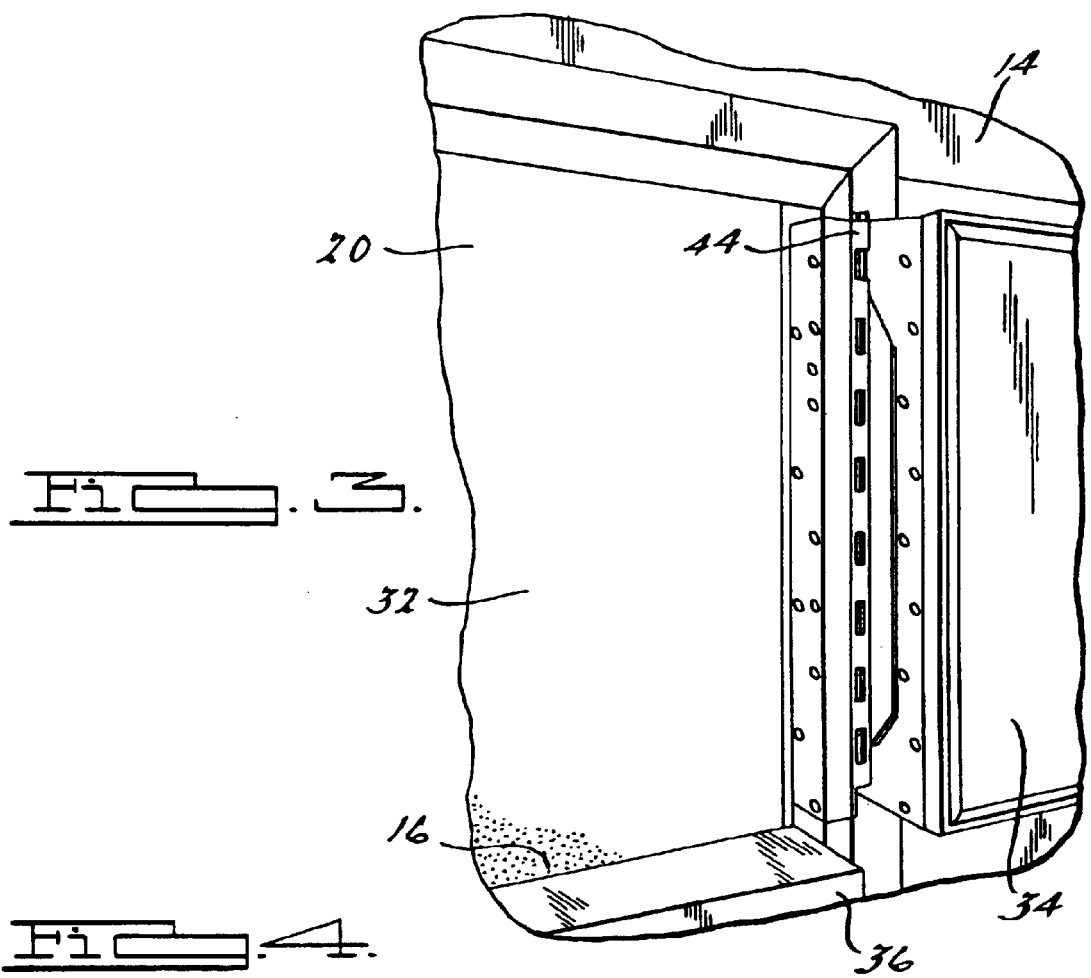
FIG. 3 is a partial perspective view of the motor vehicle of FIG. 1 illustrating the hinged connection of the door of the passageway to the vehicle body.

Referring to FIGS. 2 and 3, the motor home 10 also includes a passageway 32 located adjacent the floor 16 and extending between the interior 20 and the exterior for loading and unloading items (not shown). In FIG. 1, the position of the passageway 32 is shown in a substantially middle portion of the side 14 such that a person standing on the surface upon/along which the motor home 10 rests/travels can cleanly, conveniently, easily and quickly, load/unload items into/from the interior 20 on the floor 16.

In a preferred embodiment, the passageway 32 is generally rectangular in shape. More specifically, the passageway 32 has a size of less than two feet by two feet. Although the depth of the passageway 32 will be the thickness of the side 14, those having ordinary skill in the art will appreciate that the passageway 32 may have any shape, size, and location along the side 14 as long as a person standing on the surface upon/along which the motor home 10 rests/travels can cleanly, conveniently, easily, and quickly load/unload items into/from the interior 20 on the floor 16.

As illustrated in FIGS. 2 and 3, the motor home 10 further includes a door 34 connected to the vehicle body 12 between the interior 20 and the exterior to open and close the passageway 32. As can easily be seen, in the closed position shown in FIGS. 1 and 4, the door 34 covers the entire area defined by the passageway 32 such that no external elements—air, rain, snow, ice, insects, and so forth—can penetrate into the interior 20.

In the preferred embodiment, the door 34 is rotatably secured to the vehicle body 12 and disposed within the passageway 32 when the door 34 closes the passageway 32. More specifically, as illustrated in FIG. 3, the door 34 is hingedly connected to the vehicle body 12. A hinging mechanism 44, made of metal, extends substantially along a side defined by the passageway 32 and proximate the door 30 to permit rotation of the door 34 about an axis defined by the hinging mechanism 44. In FIGS. 2 and 3, the door 34 can be seen swung open outwardly from the passageway 32 toward the side 14. However, it will be understood by those having ordinary skill in the art that the door 34 can be secured to the vehicle body 12 and within the passageway 32 in any suitable manner, such as by sliding in grooves, so long as the door 34 is able to close the passageway 32.

Still in the preferred embodiment, the door 34, like the passageway 32, has a size of less than two feet by two feet. Moreover, in the closed position, the door 34 is flush with the vehicle body 12 such that a substantially flat side 14 is provided.

In the preferred embodiment, the door 34 further includes a latch mechanism, generally indicated at 38 in FIG. 2, to secure the door 34 to the vehicle body 12 when the door 34 closes the passageway 32. The latch mechanism 38 comprises a latch 40 attached to the door 34 and a striker 42 attached to the vehicle body 12. More specifically, the latch mechanism 38 is disposed on the door 34 within the interior 20 when the door 34 is closed. A bolt 46, also part of the latch mechanism 38, extends from the latch 40 within and through the door 34 and beyond the perimeter of the door 34 opposite the hinging mechanism 44 to matingly engage the striker 42 and, thereby, secure the door 34 to the vehicle body 12. To open the door 34, the latch mechanism 38 must be activated by actuating the latch 40 to release the bolt 46 from the striker 42 and, thereby, the door 34 from the vehicle body 12. However, those having ordinary skill in the art will understand that the door 34 can be secured to the vehicle body 12 when the door 34 closes the passageway 32 in any manner and can be opened in any manner, such as by turning a knob.

Furthermore, in the preferred embodiment, the motor home 10 includes a doorframe 36 disposed about a perimeter of the passageway 32. As illustrated in FIGS. 2 and 3, the striker 42 and the hinging mechanism 44, respectively, are imbedded into the doorframe 36. When the door 34 is in the closed position, the door 34 and the doorframe 36 are integral with the portion of the side 14 immediately surrounding the door 34 and the doorframe 36.

Figure 4:
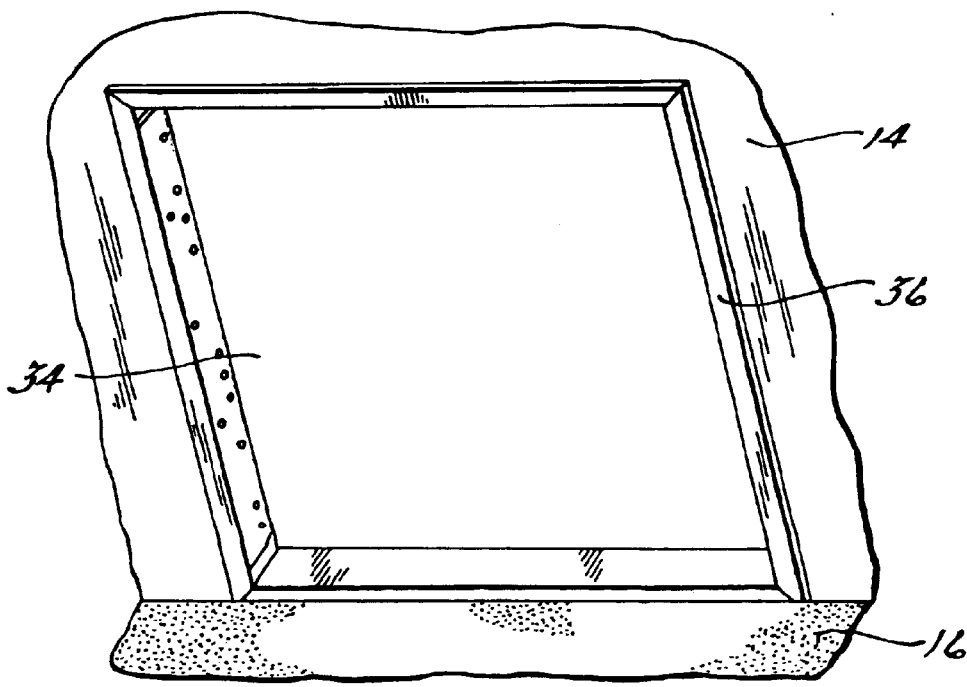
FIG. 4 is a partial perspective view of the motor vehicle of FIG. 1 illustrating the passageway in a closed position.

In operation, the door 34 is opened from the interior 20 by activating the latch mechanism 38. By retaining the door 34 in an open position, as illustrated in FIGS. 2 and 3, a passageway 32 is provided through which items may cleanly, conveniently, easily, and quickly be passed. In addition, when the door 34 is completely open or removed, the passageway 32 can serve as an emergency exit for occupants of the motor vehicle 10. The door 34 is closed from either the interior 20 or the exterior by securing the latch mechanism 38, as illustrated in FIGS. 1 and 4.

The passageway 32 may be readily adapted to any side 14 of the motor vehicle 10 and is substantially air and/or water tight when the door 34 is in the closed position. In such position, the door 34 is substantially flush with the remainder of the side 14 and, thus, presents a substantially smooth surface of the side 14. Once opened, the door 34 makes the passageway 32 readily available for cleaner, more convenient, easier, and quicker loading/unloading of items into/from the motor vehicle 10 in relation to conventional motor vehicles. And, the present invention practically eliminates the need to travel up and down steps to load/unload items into/from the motor home 10 such that the risk of occupants of the motor vehicle 10 falling and injuring themselves is greatly reduced. Accordingly, the motor vehicle 10 is safer for such loading and unloading as compared to conventional motor vehicles.

The present invention has been described in an illustrative manner. It is to be understood that the terminology that has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A motor vehicle comprising:
a vehicle body extending longitudinally and having sides, a floor, and a roof defining an interior;
at least one front wheel operatively connected to said vehicle body;
at least one rear wheel operatively connected to said vehicle body;
a first passageway located longitudinally between said at least one front wheel and said at least one rear wheel and extending transversely between said interior and an exterior of the motor vehicle and having a height greater than a width thereof to allow an occupant to enter and exit said interior;
a first door connected to said vehicle body and rotatable longitudinally to open and close said first passageway;
a second passageway located adjacent said floor and vertically above said at least one front wheel and said at least one rear wheel and longitudinally between said first door and said at least one rear wheel and extending transversely between said interior and the exterior of the motor vehicle for loading and unloading items through said second passageway, said second passageway having a width thereof at least equal to a height thereof; and
a second door connected to said vehicle body and rotatable longitudinally to open and close said second passageway.

2. A motor vehicle as set forth in claim 1 wherein said second door is rotatably secured to said vehicle body and disposed within said second passageway when said second door closes said second passageway.

3. A motor vehicle as set forth in claim 1 wherein said second passageway is generally rectangular in shape.

4. A motor vehicle as set forth in claim 3 wherein said second door is hingedly connected to said vehicle body.

5. A motor vehicle as set forth in claim 1 including a doorframe disposed about a perimeter of said second passageway.

6. A motor vehicle as set forth in claim 1 wherein said second door has a size of less than two feet by two feet.

7. A motor vehicle as set forth in claim 1 wherein said second door is flush with said vehicle body.

8. A motor vehicle as set forth in claim 1 wherein said second door further includes a latch mechanism to secure said second door to said vehicle body when said second door closes said second passageway.

9. A motor vehicle as set forth in claim 8 wherein said latch mechanism comprises a latch attached to said second door and a striker attached to said vehicle body.

10. A motor vehicle as set forth in claim 9 wherein said latch mechanism is disposed on said second door within said interior.

11. A motor vehicle as set forth in claim 1 wherein said motor vehicle comprises a motor home.

12. A motor home comprising:
a vehicle body extending longitudinally and having sides, a floor, and a roof defining an interior;
at least one front wheel operatively connected to said vehicle body,
at least one rear wheel operatively connected to said vehicle body,
a first passageway located longitudinally between said at least one front wheel and said at least one rear wheel and extending transversely between said interior and an exterior of the motor home and having a height greater than a width thereof to allow an occupant to enter and exit said interior;
a first door connected to said vehicle body and rotatable longitudinally to open and close said first passageway;
a square shaped second passageway located adjacent said floor and vertically above said at least one front wheel and said at least one rear wheel and longitudinally between said first door and said at least one rear wheel and extending transversely between said interior and the exterior of the motor home for loading and unloading items through said second passageway; and
a second door connected to said vehicle body and rotatable longitudinally to open and close said second passageway.

13. A motor vehicle comprising:
a vehicle body extending longitudinally and having sides, a floor, and a roof defining an interior;
at least one front wheel operatively connected to said vehicle body;
at least one rear wheel operatively connected to said vehicle body;
a first passageway located longitudinally between said at least one front wheel and said at least one rear wheel and extending transversely between said interior and an exterior of the motor vehicle and having a height greater than a width thereof to allow an occupant to enter and exit said interior;
a first door connected to said vehicle body and rotatable longitudinally to open and close said first passageway,
a second passageway located adjacent said floor and vertically above said at least one front wheel and said at least one rear wheel and longitudinally between said first door and said at least one rear wheel and extending transversely between said interior and the exterior of the motor vehicle for loading and unloading items through said second passageway, said second passageway having a width less than two feet and a height less than two feet; and
a second door connected to said vehicle body and rotatable longitudinally to open and close said second passageway.

* * * * *